(12) United States Patent
Ueno et al.

(10) Patent No.: US 8,057,256 B2
(45) Date of Patent: Nov. 15, 2011

(54) SIGNAL LINE WIRING IN NACELLE OF WIND TURBINE GENERATOR

(75) Inventors: Yasuhiro Ueno, Tokyo (JP); Yoshiaki Tsutsumi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/876,649

(22) Filed: Sep. 7, 2010

(65) Prior Publication Data

US 2011/0163543 A1    Jul. 7, 2011

Related U.S. Application Data

(63) Continuation of application No. PCT/JP2010/054464, filed on Mar. 16, 2010.

(51) Int. Cl.
*H01R 11/00* (2006.01)
*H01R 25/00* (2006.01)

(52) U.S. Cl. ........... 439/502; 439/505; 439/638; 290/44

(58) Field of Classification Search .................. 290/44, 290/55, 1 A; 439/502, 505, 638; 361/641, 361/42, 147
See application file for complete search history.

(56) References Cited

U.S. PATENT DOCUMENTS

| | | | |
|---|---|---|---|
| 5,365,424 A | 11/1994 | Deam et al. | |
| 6,098,127 A * | 8/2000 | Kwang | 710/62 |
| 6,498,890 B1 * | 12/2002 | Kimminau | 385/134 |
| 7,390,224 B2 * | 6/2008 | Sodemann et al. | 439/638 |
| 7,601,006 B2 | 10/2009 | Christoffersen | |
| 7,762,836 B2 * | 7/2010 | Rubin et al. | 439/505 |
| 2002/0119706 A1 * | 8/2002 | Sagues et al. | 439/638 |
| 2003/0162437 A1 * | 8/2003 | Erenberger et al. | 439/502 |
| 2004/0002256 A1 * | 1/2004 | Bauermeister et al. | 439/502 |
| 2005/0031944 A1 * | 2/2005 | Sodemann et al. | 429/150 |
| 2007/0024059 A1 * | 2/2007 | D'Atre et al. | 290/44 |
| 2008/0111379 A1 * | 5/2008 | Altemark | 290/44 |
| 2008/0181393 A1 * | 7/2008 | Brost et al. | 379/413 |
| 2009/0174991 A1 * | 7/2009 | Mahdavi | 361/679.02 |
| 2010/0052322 A1 * | 3/2010 | Fortmann et al. | 290/44 |

* cited by examiner

*Primary Examiner* — Julio Gonzalez
(74) *Attorney, Agent, or Firm* — Kanesaka Berner & Partners (57) ABSTRACT

A wind turbine generator includes: a nacelle provided with a plurality of modules; a controller provided in a first module out of the plurality of modules; a first device provided in a second module out of the plurality of modules. The controller and the first device are connected with a device-side connection mechanism and a controller-side connection mechanism to allow electrical communications between the controller and the first device. The device-side connection mechanism includes: a first connection element; and a first multicore cable including a plurality of signal lines with one end connected to the controller and the other end connected to the first connection element. The device-side connection mechanism provides an electrical connection between the first connection element and the first device.

4 Claims, 7 Drawing Sheets

SIGNAL LINE WIRING IN NACELLE OF WIND TURBINE GENERATOR

CROSS-REFERENCE TO RELATED APPLICATION

This is a continuation application of International Application No. PCT/JP2010/054464, filed on Mar. 16, 2010.

BACKGROUND OF THE INVENTION

1. Field of the Invention

The present invention relates to a wind turbine generator and more specifically to signal line wiring in the nacelle of the wind turbine generator.

2. Description of the Related Art

A wind turbine generator is an aggregate of many electrical/electronic devices and mechanical devices, and achieves efficient power generation through their coordinated operations. For example, a pitch control system is provided in a rotor head, and a gear box, a generator, an electric power converting device, a yaw control system, and other auxiliary systems (a hydraulic system, a lubrication system and so on) are provided in a nacelle. These devices are controlled by a controller (typically, a nacelle control board provided in the nacelle). The controller detects statuses of the respective devices and the wind condition by using measuring devices and sensors provided in various positions of the wind turbine generator, and optimally controls the electric/electronic devices and the mechanical devices within the wind turbine generator, in response to the detected statuses and wind condition.

In a wind turbine generator, in which a large number of electric/electronic and mechanical devices operate cooperatively, a large number of signal lines are used for transmitting electrical signals. The respective devices of the wind turbine generator need to be connected with signal lines which supply control signals for control of the respective devices. Moreover, the respective measuring devices and sensors need to be connected with signal lines for transmitting detection signals to the controller. Thus, a large number of signal lines are wired in the nacelle of the wind turbine generator. In association therewith, U.S. Patent Application Publication No. 2008/0293260 A1 discloses a connector structure for flowing a great current in a wind turbine generator. U.S. Pat. No. 5,365,424 discloses a bus structure for transmitting great electric power in a wind turbine generator.

One problem is difficulty in the wiring of the signal lines in the nacelle. An increase in the number of signal lines necessitates a long time for the wiring of the signal lines and may also cause increased wiring mistakes. With such background, there is a need of providing a technique that makes it easy to wire a large number of signal lines in the nacelle of the wind turbine generator.

SUMMARY OF THE INVENTION

Therefore, an objective of the present invention is to provide a technique that makes it easy to wire a large number of signal lines in a nacelle of a wind turbine generator.

In an aspect of the present invention, a wind turbine generator includes: a nacelle provided with a plurality of modules; a controller provided in a first module out of the plurality of modules; a first device provided in a second module out of the plurality of modules. The controller and the first device are connected with a device-side connection mechanism and a controller-side connection mechanism to allow electrical communications between the controller and the first device. The controller-side connection mechanism includes: a first connection element; and a first multicore cable including a plurality of signal lines with one end connected to the controller and the other end connected to the first connection element. The device-side connection mechanism provides an electrical connection between the first connection element and the first device.

In one embodiment, the device-side connection mechanism includes: a second connection element; and a second multicore cable including a plurality of signal lines with one end connected to the second connection element and the other end connected to the first device.

The wind turbine generator may further include a second device provided in one of the plurality of modules (other than the first module), and the controller and the second device may be connected with: a third connection element; a third multicore cable including a plurality of signal lines with one end connected to the controller and the other end connected to the third connection element; a fourth connection element connected to the third connection element; and a fourth multicore cable including a plurality of signal lines with one end connected to the second device and the other end connected to the fourth connection element. In this case, it is preferable that the third connection element is structured to be physically non-connectable to the second connection element and that the fourth connection element is structured to be physically non-connectable to the first connection element.

The device-side connection mechanism may include: a signal relay board provided with a receptacle connected to the first connection element; and a plurality of signal lines with one end connected to the signal relay board and the other end connected to the first device.

In a case where the first device includes a plurality of sensors, it is preferable that the plurality of signal lines of the device-side connection mechanism include a plurality of grounding lines respectively connected to the plurality of sensors and that the plurality of grounding lines are commonly connected to the ground by the signal relay board.

In a case where the plurality of signal lines of the first multicore cable include a first power supply line and the first device includes a plurality of sensors, it is preferable that the plurality of signal lines of the device-side connection mechanism include a plurality of second power supply lines respectively connected to the plurality of sensors and that the plurality of second power supply lines are commonly connected to the first power supply line with the signal relay board.

In one embodiment, the second module is a front module installed with a gear box connected to a wind turbine rotor, and the first module is a rear module installed with a generator connected to the gear box. In this case, it is preferable that the plurality of modules further includes a turning module including at least part of a yaw turning system that turns the nacelle in an azimuthal direction, that the turning module is provided on a top of a tower of the wind turbine generator, and that the front module and the rear module are provided on the turning module.

The present invention makes it easy to wire a large number of signal lines in the nacelle of the wind turbine generator.

DESCRIPTION OF THE PREFERRED EMBODIMENTS

Figure 1:
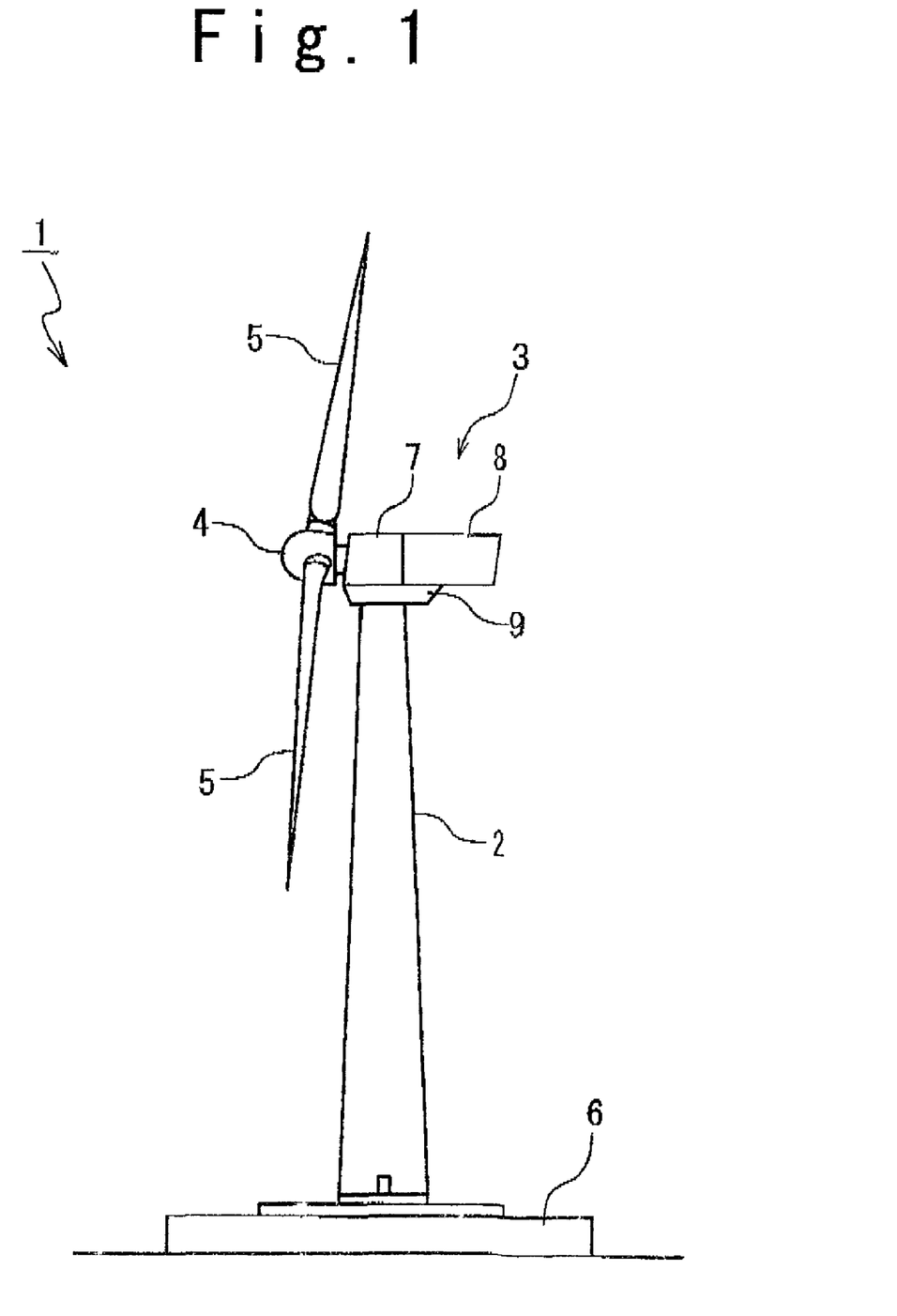
FIG. 1 is a side view showing the structure of a wind turbine generator in one embodiment of the present invention.

FIG. 1 is a side view showing the structure of a wind turbine generator 1 in one embodiment of the present invention. The wind turbine generator 1 is provided with: a tower 2 provided upright on a base 6; a nacelle 3 provided on the top of the tower 2; a rotor head 4 rotatably attached to the nacelle 3; and wind turbine blades 5 attached to the rotor head 4. The rotor head 4 and the wind turbine blades 5 constitute a wind turbine rotor. Upon rotation of the wind turbine rotor by wind power, the wind turbine generator 1 generates electric power and supplies the electric power to the utility grid connected to the wind turbine generator 1.

In this embodiment, the nacelle 3 includes three modules: a front module 7, a rear module 8, and a turning module 9. The turning module 9 is provided on the tower 2, and the front module 7 and the rear module 8 are provided on the turning module 9. The front module 7 is located adjacently to the rotor head 4, while the rear module 8 is located away from the rotor head 4. The division of the nacelle 3 into a plurality of modules effectively facilitates transportation of the nacelle 3 to the construction site where the wind turbine generator 1 is to be built.

Figure 2:
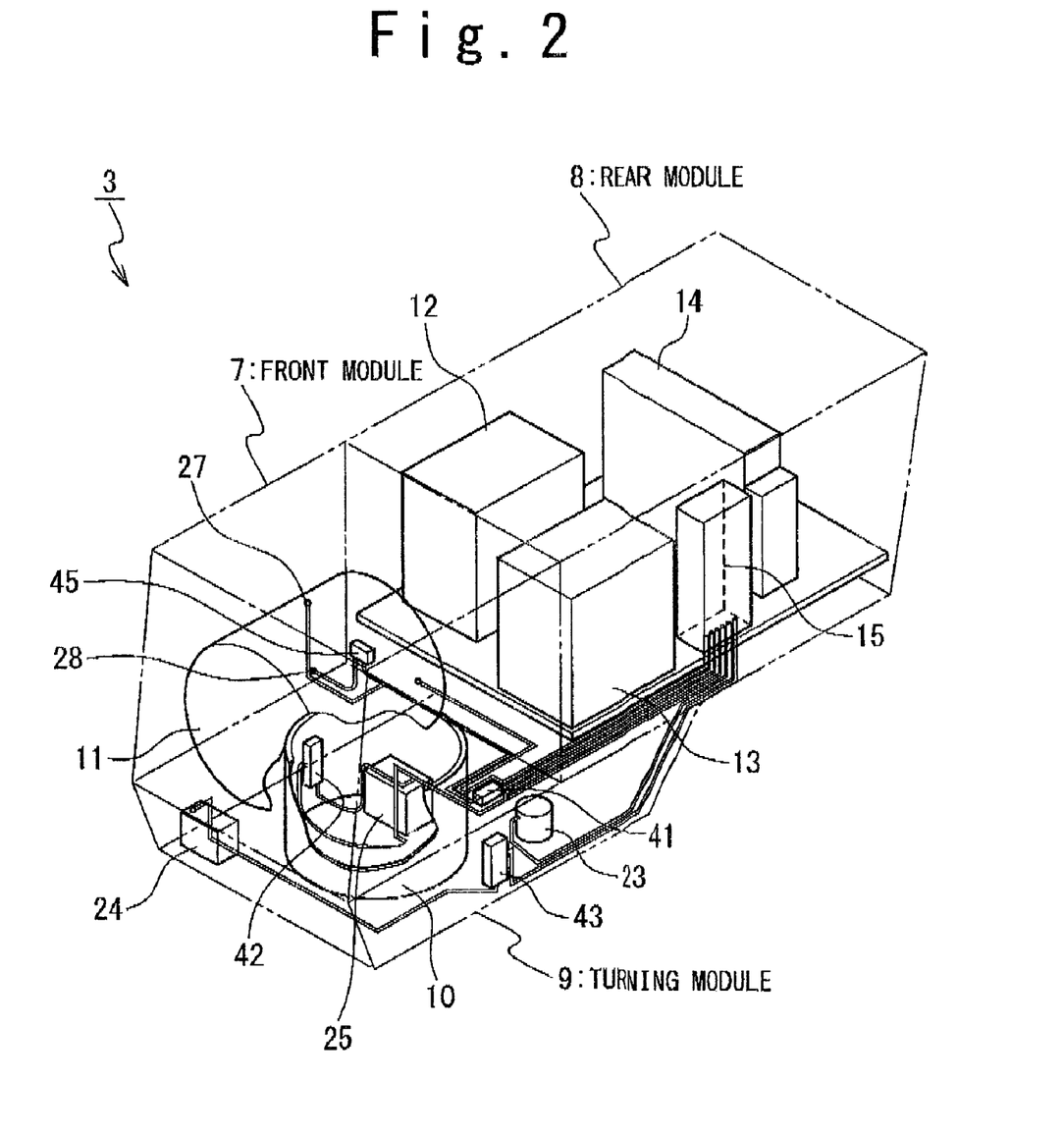
FIG. 2 is a perspective view showing the inner structure of a nacelle in one embodiment.
Figure 3A:
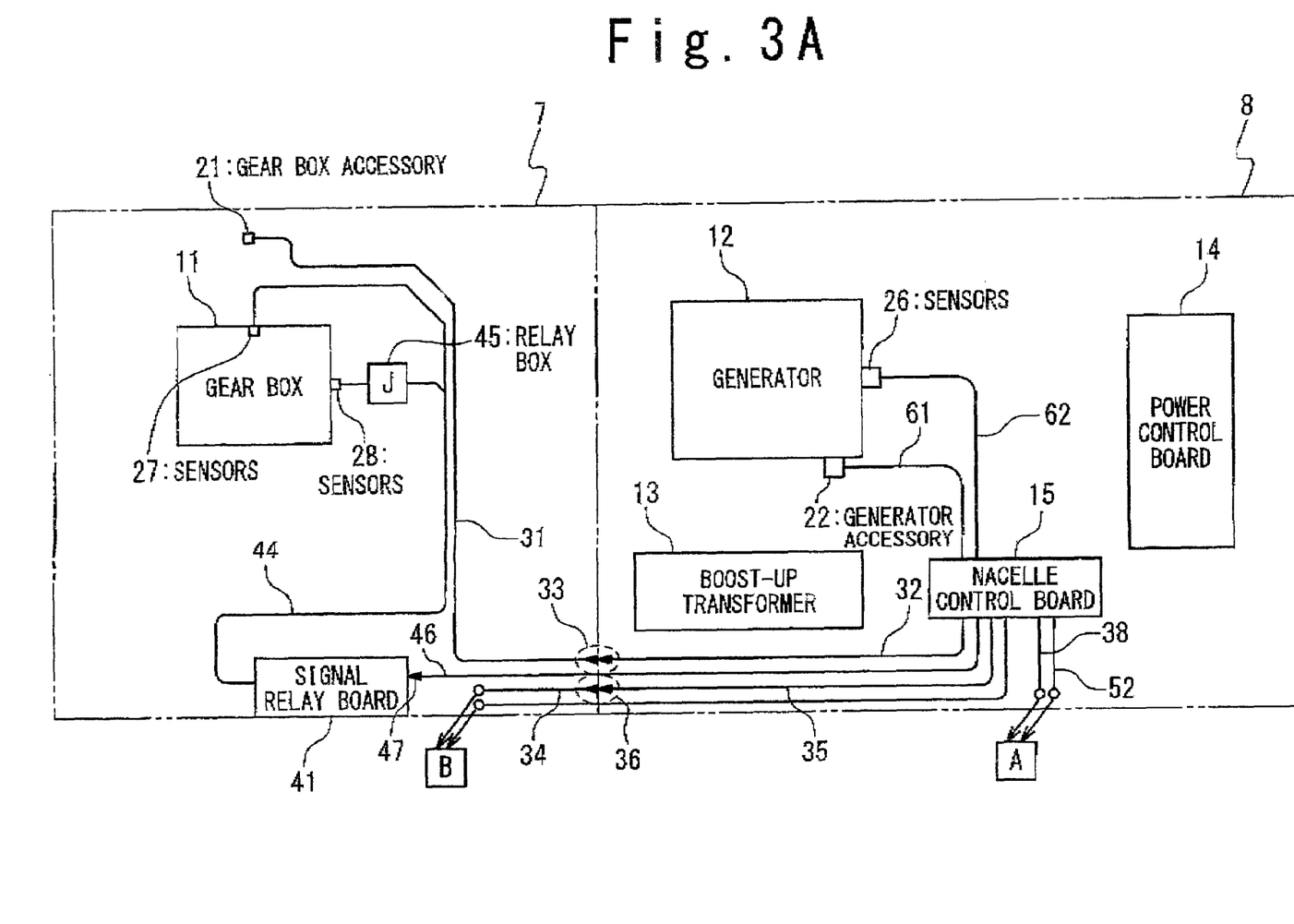
FIG. 3A is a block diagram showing cable wiring inside the nacelle in one embodiment.
Figure 3B:
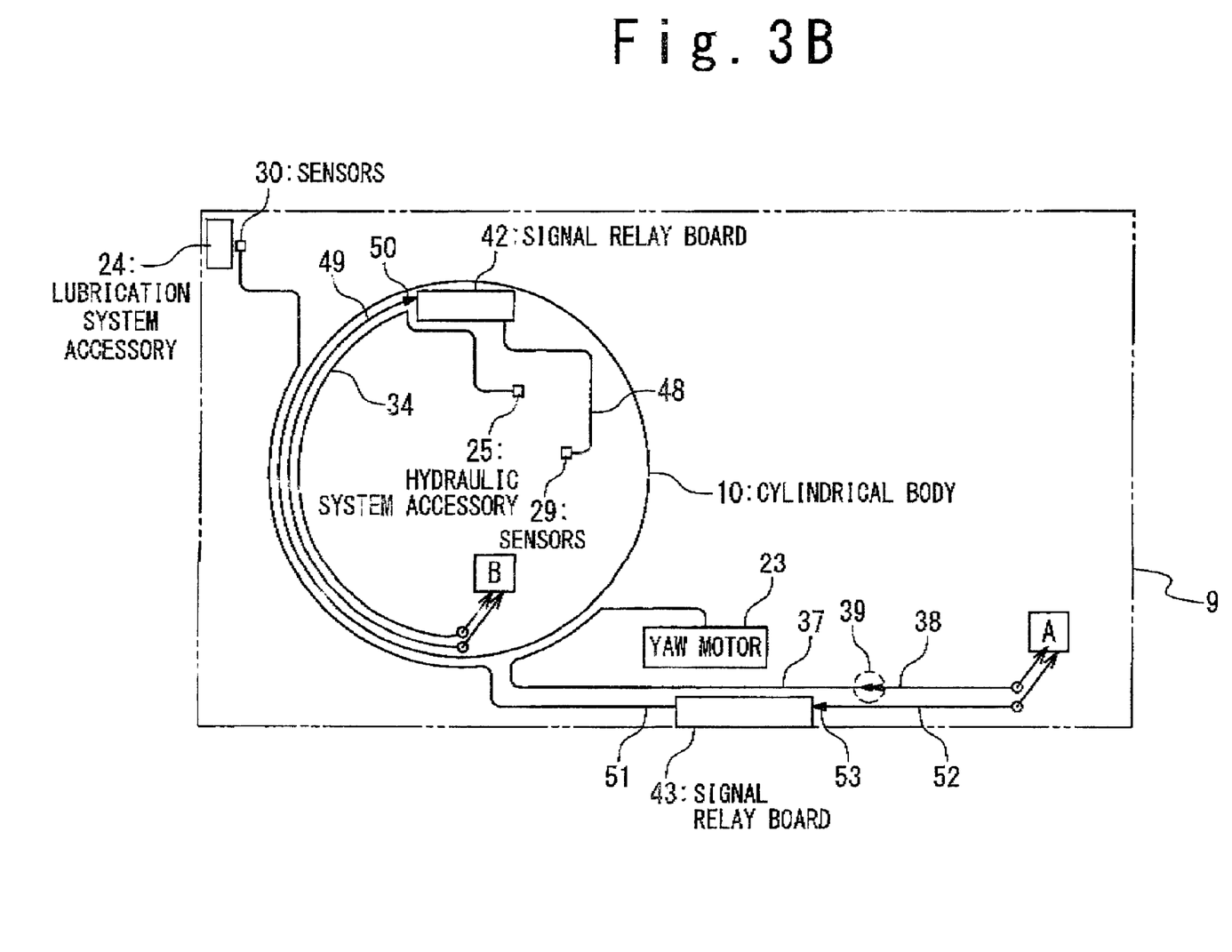
FIG. 3B is a block diagram showing the cable wiring inside the nacelle in one embodiment.

FIG. 2 is a perspective view showing the inner structure of the nacelle 3 in one embodiment. FIGS. 3A and 3B are block diagrams showing cable wiring in the nacelle 3. Here, FIG. 3A illustrates the cable wiring in the front module 7 and the rear module 8, and FIG. 3B illustrates the cable wiring in the turning module 9.

The front module 7 is installed with a gear box 11 and a gear box accessory 21. The rear module 8 is installed with a generator 12, a boost-up transformer 13, a power control board 14, a nacelle control board 15, and a generator accessory 22. The turning module 9 is provided with a cylindrical body 10. The turning module 9 includes a yaw motor 23 and a lubrication system accessory 24 provided outside of the cylindrical body 10 and includes a hydraulic system accessory 25 provided inside of the cylindrical body 10.

In the following, a brief description is given of each of the aforementioned devices. The gear box 11 rotates the rotor of the generator 12 at a higher speed than that of the rotation of the rotor head 4. The gear box accessory 21 is a peripheral device that assists the operation of the gear box 21, including a supply system that supplies lubricant to the gear box 11, for example. The generator 12 is driven by the wind turbine rotor and the gear box 11 to generate electric power. The generator accessory 22 is a peripheral device that assists the operation of the generator 22. The boost-up transformer 13 boosts up the voltage of the electric power generated by the generator 12 in accordance with the voltage of the utility grid (the utility voltage). The power control board 14 monitors the electric power exchange between the generator 12 and the utility grid. The nacelle control board 15 is a controller that collectively controls the respective devices provided in the nacelle. The yaw motor 23 is a driving device that turns the nacelle 3 in the azimuthal direction; the yaw motor 23 is a component of a yaw turning system. The lubrication system accessory 24 is one of the components of the lubrication system that supplies lubricant to main shaft bearings (not shown) rotatably supporting the main shaft (not shown) connected to the rotor head 4. The hydraulic system accessory 25 is one of the components of a hydraulic system that supplies operating fluid to a pitch control mechanism controlling the pitch angle of the wind turbine blades 5.

Sensors are attached to the respective devices in the nacelle 3 for measuring the statuses thereof. In this embodiment, a group of sensors 26 are attached to the generator 12, and groups of sensors 27 and 28 are attached to the gear box 11. Further, a group of sensors 29 are attached to the hydraulic system accessory 25, and a group of sensors 30 are attached to the lubrication system accessory 24.

Schematically, signal lines are wired in the wind turbine generator 1 of this embodiment as described below. Multicore cables attached to the devices and sensors installed in the rear module 8, which is provided with the nacelle control board 15, are directly connected to a terminal block provided on the nacelle control board 15 by using plugs. The multicore cables are each provided with a plurality of signal lines therethrough. Connecting one multicore cable to the nacelle control board 15 allows a plurality of signal lines to be simultaneously connected to the nacelle control board 15.

For the devices and sensors provided in the modules other than the rear module 8, on the other hand, connectors or signal relay boards are used in addition to multicore cables to wire signal lines. Specifically, for devices provided in modules other than the rear module 8, the multicore cables connected to the devices are connected to multicore cables connected to the nacelle control board 15 with connectors to thereby wire a desired number of signal lines. On the other hand, for the sensors provided in the modules other than the rear module 8, the signal lines of the sensors are connected to signal relay boards provided in the respective modules and the signal relay boards are connected to the nacelle control board 15 with multicore cables to thereby wire a desired number of signal lines. In either case, use of a multicore cable permits a plurality of signal lines to be simultaneously connected to the nacelle control board 15. In the following, a description is given of the cable wiring inside the nacelle 3, more specifically.

Figure 4:
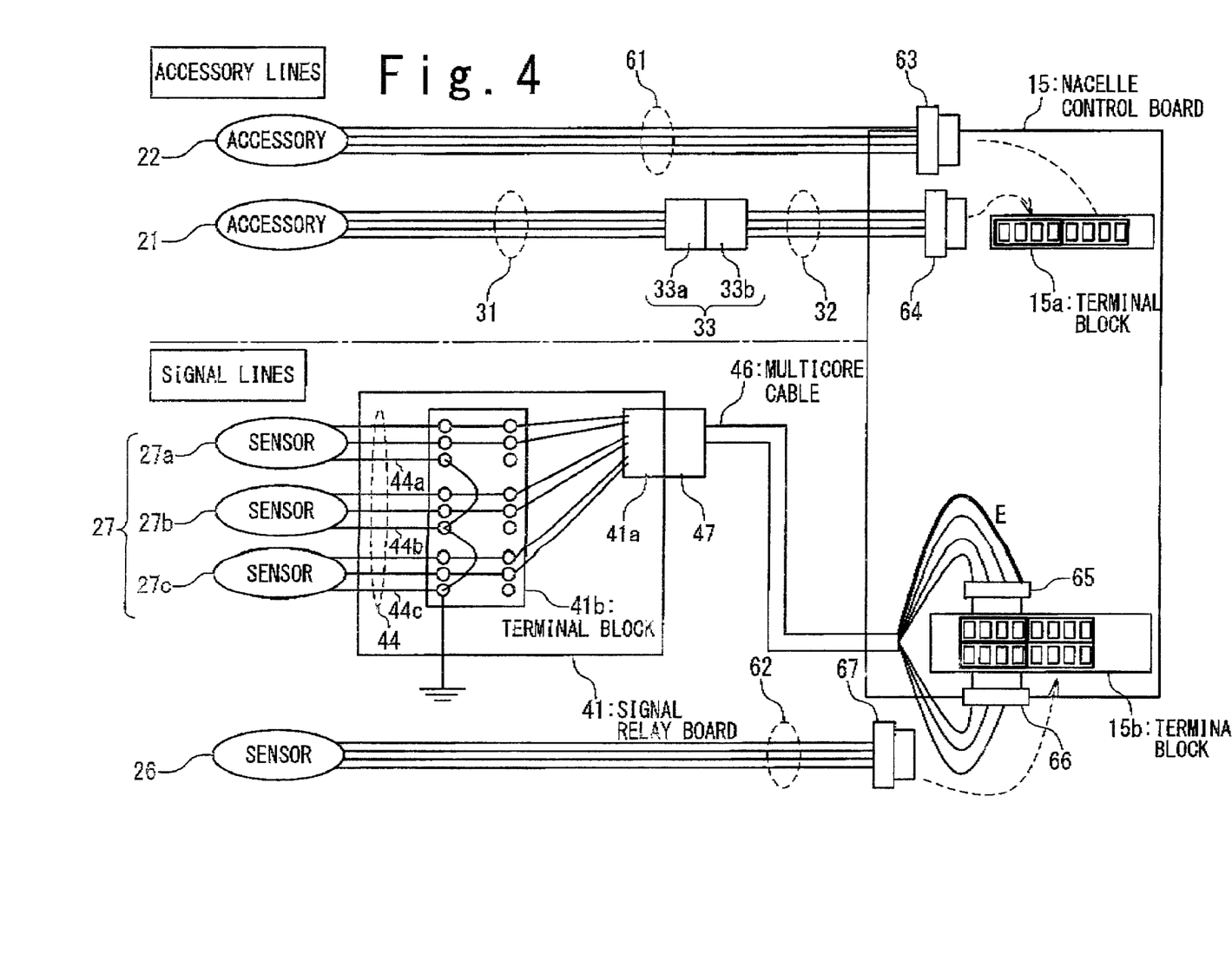
FIG. 4 is a block diagram showing details of the cable wiring inside the nacelle in one embodiment.

Referring to FIG. 3A, the generator accessory 22 provided in the rear module 8 is connected to the nacelle control board 15 with a multicore cable 61. More specifically, as shown in FIG. 4, one end of the multicore cable 61 is connected to the generator accessory 22, the other end of the multicore cable 61 is connected to a plug 63, and the plug 63 is connected to a terminal block 15a of the nacelle control board 15. On the other hand, referring back to FIG. 3A, the sensors 26 provided in the generator 12 are connected to the nacelle control board 15 with a multicore cable 62. More specifically, as shown in FIG. 4, one end of the multicore cable 62 is connected to the sensors 26, the other end of the multicore cable 62 is connected to a plug 67, and the plug 67 is connected to a terminal block 15b of the nacelle control board 15.

On the other hand, as shown in FIG. 3A, the gear box accessory 21 provided in the front module 7 is connected to the nacelle control board 15 with multicore cables 31 and 32 and a connector 33. More specifically, the multicore cable 31 is connected to the gear box accessory 21 in the front module 7, the multicore cable 32 is connected to the nacelle control board 15 in the rear module 8, and the multicore cables 31 and 32 are connected together with the connector 33. As shown in FIG. 4, the connector 33 is provided with a jack 33a connected to the multicore cable 31 and a plug 33b connected to the multicore cable 32, and the jack 33a and the plug 33b are connected together to thereby connect the multicore cables 31 and 32. It should be noted that, in this embodiment, the terms "plug" and "jack" of the connector only identify two separate parts composing the connector 33; it would be obvious that the jack may be connected to the multicore cable 31 and the plug may be connected to the multicore cable 32.

On the other hand, the sensors 27 and 28 attached to the gear box 11 are connected to the nacelle control board 15 with a signal line bundle 44, a signal relay board 41, and a multicore cable 46 (see FIG. 3A). Conceptually illustrated in FIG. 4 is the cable routing between the sensors 27 and the nacelle control board 15. It should be that, in FIG. 4, the group of sensors 27 includes three sensors 27a, 27b, and 27c, but the number of sensors 27 is not limited to three. The signal relay board 41 is provided in the front module 7, and includes a receptacle 41a and a terminal block 41b. On the other hand, the signal line bundle 44 is provided with signal lines respectively connected to the sensors 27a, 27b, and 27c. The signal lines of the signal line bundle 44 are respectively connected to terminals provided on the terminal block 41b. In addition, the signal line bundle 44 is provided with grounding lines 44a, 44b, and 44c respectively connected to the sensors 27a, 27b, and 27c. The grounding lines 44a, 44b, and 44c are commonly connected to the casing of the signal relay board 41, that is, the ground. Other lines of the signal line bundle 44 are connected to the receptacle 41a via the terminal block 41b. One end of the multicore cable 46 is connected to a plug 47, and the other end of the multicore cable 46 is connected to a plug 65. The plug 47 is connected to the receptacle 41a and the plug 65 is connected to the terminal block 15b of the nacelle control board 15, whereby the sensors 27 are electrically connected to the nacelle control board 15. Here, the plug 47 is so configured as to connect the grounding lines out of the signal lines provided through the multicore cable 46 to the casing of the signal relay board 41. This achieves connecting the grounding lines of the multicore cable 46 to the ground. Although not shown in FIG. 4, the sensors 28 are also connected to the nacelle control board 15 via the multicore cable 46 in the same manner. In FIG. 3A, a relay box 45 is inserted in the signal line bundle 44 that connects together the sensors 28 and the signal relay board 41, but the presence of the relay box 45 is essentially not important.

Figure 5:
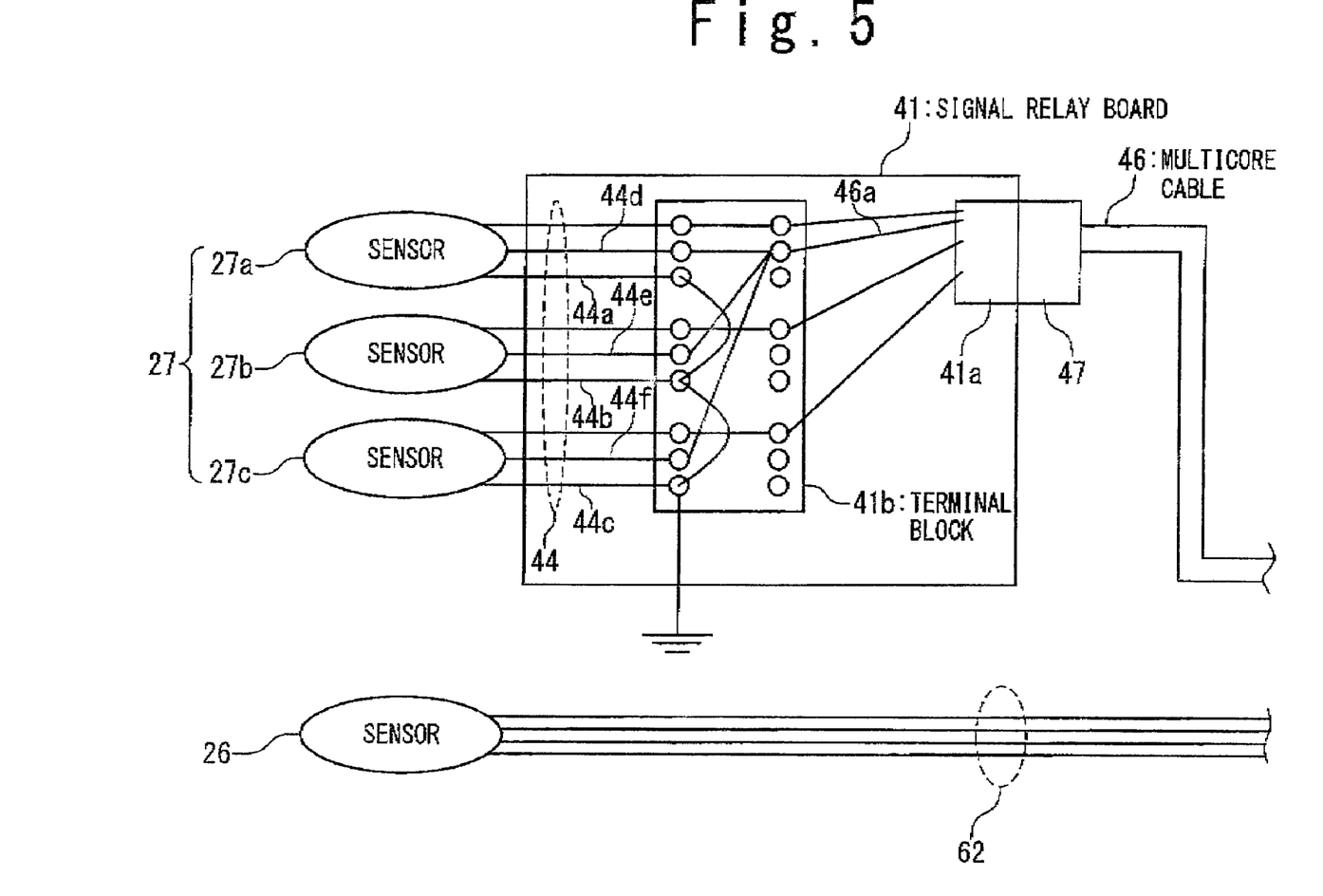
FIG. 5 is a conceptual diagram showing a preferred structure of a signal relay board in one embodiment.

Here, as shown in FIG. 5, a power supply line (line supplied with the power supply voltage) of the multicore cable 46 may also be shared by the sensors 27a, 27b, and 27c. Specifically, the signal line bundle 44 is provided with power supply lines 44d, 44e, and 44f respectively connected to the sensors 27a, 27b, and 27c. On the other hand, a power supply line 46a connected to the power supply line of the multicore cable 46 is drawn out of the receptacle 41a to the terminal block 41b, and the power supply lines 44d, 44e, and 44f, which are respectively connected to the sensors 27a, 27b, and 27c, are commonly connected to the power supply line 46a. This configuration effectively reduces the number of lines included in the multicore cable 46.

The hydraulic system accessory 25, which is provided inside the cylindrical body 10 of the turning module 9, is connected to the nacelle control board 15 with multicore cables 34 and 35 and a connector 36 (see FIGS. 3A and 3B). Here, the multicore cable 34 I routed through the turning module 9 and the front module 7, and the multicore cable 35 is provided in the rear module 8 and connected to the nacelle control board 15. The multicore cables 34 and 35 are connected together with the connector 36.

Similarly, the yaw motor 23, which is provided outside the cylindrical body 10 of the turning module 9, is connected to the nacelle control board 15 with multicore cables 37 and 38. Specifically, the multicore cable 37 is connected to the yaw motor 23 in the turning module 9, the multicore cable 38 is connected to the nacelle control board 15 in the rear module 8, and the multicore cables 37 and 38 are connected together with a connector 39. Although the connector 39 is shown as being located inside the turning module 9 in FIG. 3B, the connector 39 may be located in the rear module 8.

Further, the sensors 29, which are provided inside the cylindrical body 10 of the turning module 9, are connected to the nacelle control board 15 with a signal line bundle 48, a signal relay board 42, and a multicore cable 49. The signal line bundle 48 is connected to the signal relay board 42 in the turning module 9. Here, the grounding lines of the signal line bundle 48 are connected to the casing of the signal relay board 42, that is, the ground, and other lines of the signal line bundle 48 are electrically connected to a receptacle of the signal relay board 42. A plug 50 is provided at one end of the multicore cable 49 and connected to the receptacle of the signal relay board 42. The other end of the multicore cable 49 is connected to the nacelle control board 15. With this configuration, the sensors 29 are electrically connected to the nacelle control board 15.

Similarly, the sensors 30, which are provided outside the cylindrical body 10 of the turning module 9, are connected to the nacelle control board 15 with a signal line bundle 51, a signal relay board 43, and a multicore cable 52. The signal line bundle 51 is connected to the signal relay board 43 in the turning module 9. Here, the grounding lines of the signal line bundle 51 are connected to the casing of the signal relay board 43, that is, the ground, and other lines of the signal line bundle 51 are electrically connected to a receptacle of the signal relay board 43. A plug 53 is provided at one end of the multicore cable 52 has one end, and connected to the receptacle of the signal relay board 43. The other end of the multicore cable 52 is connected to the nacelle control board 15. With such configuration, the sensors 30 are electrically connected to the nacelle control board 15.

An advantage of such cable wiring is remarkable reduction in the labor required for wiring the signal lines at the construction site where the wind turbine generator 1 is to be built. That is, in a factory where the front module 7, the rear module 8, and the turning module 9 are manufactured, connections are made other than those listed below:

(1) the connection between the multicore cables 31 and 32 with the connector 33;
(2) the connection of the plug 47 of the multicore cable 46 to the signal relay board 41;
(3) the connection between the multicore cables 34 and 35 with the connector 36;
(4) the connection of the plug 50 of the multicore cable 49 to the signal relay board 42;
(5) the connection between the multicore cables 37 and 38 with the connector 39; and
(6) the connection of the plug 53 of the multicore cable 51 to the signal relay board 43.

In this state, the front module 7, the rear module 8, and the turning module 9 are transported to the construction site where the wind turbine generator 1 is to be built. After the front module 7, the rear module 8, and the turning module 9 are combined to form the nacelle 3 on the tower 2, the connections (1) to (6) described above are made. With such procedure, the cable wiring can be easily achieved at the construction site where the wind turbine generator 1 is built.

The fact that reduced labor is required for the cable wiring leads to prevention of wiring mistakes. Here, in order to prevent the wiring mistakes even more effectively, it is preferable that the connectors 33, 36, and 39 and the plugs 47, 50, and 53 are so configured as to physically avoid the wiring mistakes. That is, a configuration such that the plugs, the jacks, and the receptacles used in the wind turbine generator 1 can be physically connected together only in the correct combinations allows avoiding the wiring mistakes more effectively.

Figure 6A:
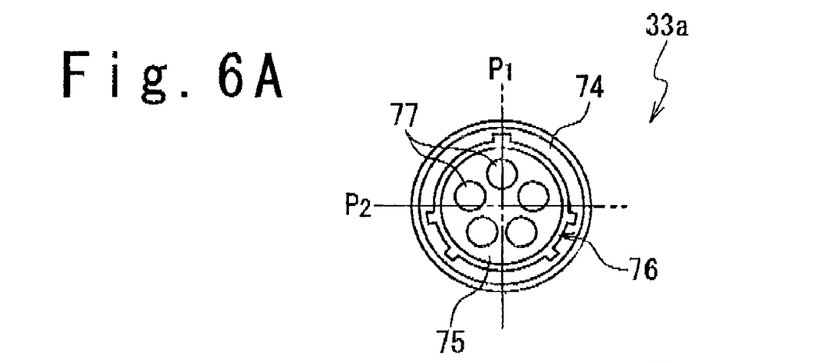
FIG. 6A is a diagram showing the structure of a jack of a connector in one embodiment.
Figure 6B:
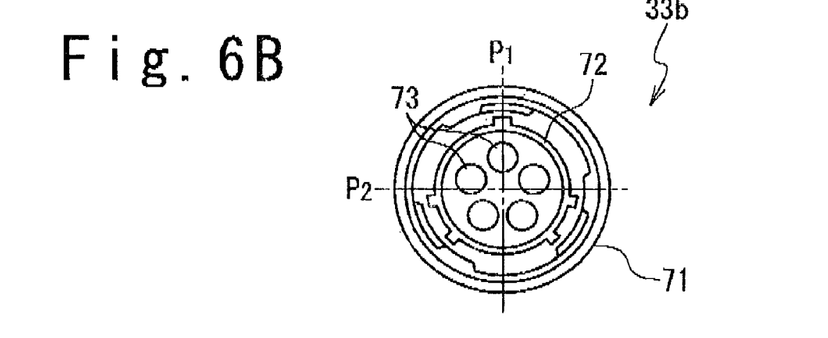
FIG. 6B is a diagram showing a structure of a plug of the connector in one embodiment.

FIGS. 6A to 6D show examples of configurations of the connectors 33 and 36 for preventing the wiring mistakes. Here, FIGS. 6A and 6B respectively show a structure of the jack 33a and the plug 33b of the connector 33, and FIGS. 6C and 6D respectively show a structure of a jack 36a and a plug 36b of the connector 36. As shown in FIG. 6A, the jack 33a is provided with a jack casing 74 and a socket insert 75. On the other hand, as shown in FIG. 6B, the plug 33b is provided with a plug casing 71, a plug insert 72, and pins 73. A plurality of protrusions are provided on the outer surface of the plug insert 72. Between the jack casing 74 and the socket insert 75 of the jack 33a, a groove 76 for accommodating the plug insert 72 is provided. The groove 76 has a shape corresponding to the shape of the plug insert 72. Further, pin holes 77 for accommodating the pins 73 are provided for the socket insert 75. In FIGS. 6A and 6B, symbols $P_1$ and $P_2$ indicate virtual reference planes used for showing the positions of the pins 73 and the pin holes 77.

Figure 6C:
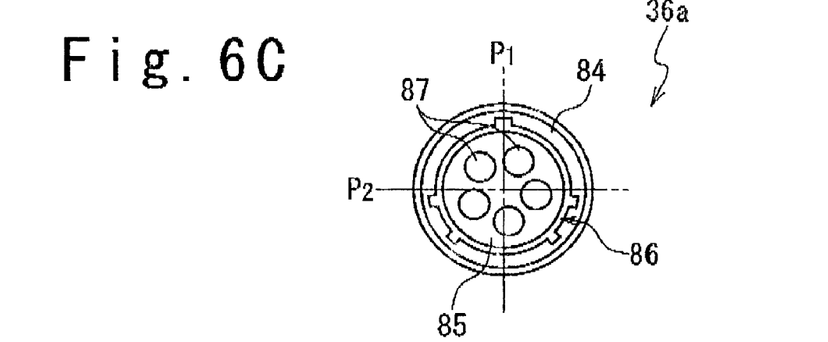
FIG. 6C is a diagram showing a structure of a jack of a connector in one embodiment.
Figure 6D:
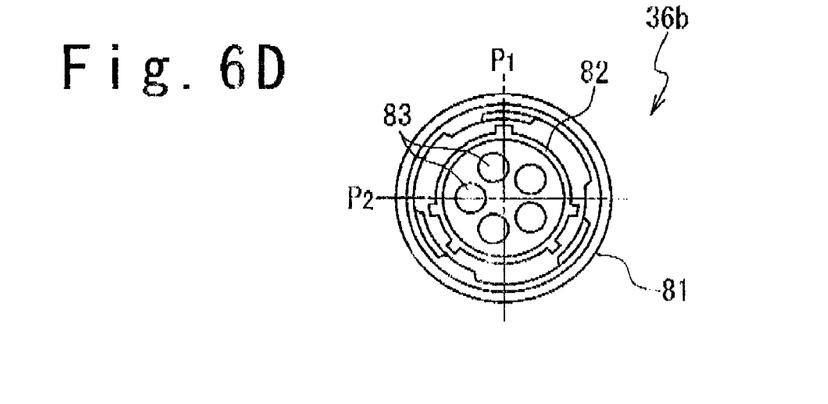
FIG. 6D is a diagram showing a structure of a plug of the connector in one embodiment.

Referring to FIGS. 6C and 6D, the jack 36a and the plug 36b of the connector 36 have shapes similar to those of the jack 33a and the plug 33b of the connector 33. Specifically, as shown in FIG. 6C, the jack 36a is provided with a jack casing 84 and a socket insert 85. On the other hand, the plug 36b is provided with a plug casing 81, a plug insert 82, and pins 83 as shown in FIG. 6D. A plurality of projections are provided on the outer surface of the plug insert 82. Between the jack casing 84 and the socket insert 85 of the jack 36a, a groove 86 for accommodating the plug insert 82 is provided. The groove 86 has a shape corresponding to the shape of the plug insert 82. Further, at the socket insert 85, pin holes 88 for accommodating the pins 83 are provided. In FIGS. 6C and 6B, symbols $P_1$ and $P_2$ indicate virtual reference planes used for showing the positions of the pins 83 and the pin holes 87.

Here, the protrusions provided on the outer surfaces of the plug inserts 72 and 82 are at the same positions with respect to the reference planes $P_1$ and $P_2$, but the positions of the pins 83 and the pin holes 87 with respect to the reference planes $P_1$ and $P_2$ are different from the positions of the pins 73 and the pin holes 77. With such structures of the connectors 33 and 36, the plugs and the jacks of the connectors 33 and 36 can be connected together only in the correct combinations. Configurations such that connections can be achieved only in correct combinations can be provided in the same manner for other plugs, jacks, and receptacles. This is preferable in terms of preventing the wiring mistakes in the wind turbine generator 1.

What is claimed is:

1. A wind turbine generator, comprising:
a nacelle provided with a plurality of modules;
a controller provided in a first module out of said plurality of modules;
a first device provided in a second module out of said plurality of modules,
wherein
said controller and said first device are connected with a device-side connection mechanism and a controller-side connection mechanism to allow electrical communications therebetween,
said device-side connection mechanism includes:
a first connection element;
a first multicore cable including a plurality of signal lines with one end connected to said controller and the other end connected to said first connection element;
a signal relay board provided with a receptacle connected to said first connection element; and
a plurality of signal lines each with one end connected to said signal relay board and the other end connected to said first device,
said controller-side connection mechanism provides an electrical connection between said first connection element and said first device,
said first device includes a plurality of sensors,
said plurality of signal lines of said device-side connection mechanism include a plurality of grounding lines respectively connected to said plurality of sensors, and
said plurality of grounding lines are commonly connected to ground by said signal relay board.

2. The wind turbine generator according to claim 1, wherein said device-side connection mechanism further includes:
a second connection element; and
a second multicore cable including a plurality of signal lines with one end connected to said second connection element and the other end connected to said first device.

3. The wind turbine generator according to claim 2, further comprising:
a second device provided in one of said plurality of modules other than said first module,
wherein said controller and said second device are electrically connected with:
a third connection element,
a third multicore cable including a plurality of signal lines with one end connected to the controller and the other end connected to the third connection element,
a fourth connection element connected to the third connection element, and
a fourth multicore cable including a plurality of signal lines with one end connected to the second device and the other end connected to the fourth connection element,
wherein said third connection element is structured to be physically non-connectable to said second connection element, and
wherein said fourth connection element is structured to be physically non-connectable to said first connection element.

4. A wind turbine generator, comprising:
a nacelle provided with a plurality of modules;
a controller provided in a first module out of said plurality of modules;
a first device provided in a second module out of said plurality of modules,
wherein
said controller and said first device are connected with a device-side connection mechanism and a controller-side connection mechanism to allow electrical communications therebetween,
said device-side connection mechanism includes:
a first connection element;

a first multicore cable including a plurality of signal lines with one end connected to said controller and the other end connected to said first connection element;

a signal relay board provided with a receptacle connected to said first connection element; and a plurality of signal lines each with one end connected to said signal relay board and the other end connected to said first device, said controller-side connection mechanism provides an electrical connection between said first connection element and said first device, said plurality of signal lines of said first multicore cable include a first power supply line, said first device includes a plurality of sensors, said plurality of signal lines of said device-side connection mechanism include a plurality of second power supply lines respectively connected to said plurality of sensors, and said plurality of second power supply lines are commonly connected to said first power supply line by said signal relay board.

* * * * *